United States Patent
O'Shea

[15] 3,686,312
[45] Aug. 22, 1972

[54] 3,5-DIHYDROCARBYL-4-HYDROXYPHENYL 3-HYDROCARBYL-4-HYDROXY-5-(DIALKYLAMINO METHYL) BENZYL SULFIDE ANTIOXIDANTS

[72] Inventor: Francis X. O'Shea, Naugatuck, Conn.

[73] Assignee: Uniroyal, Inc., New York, N.Y.

[22] Filed: Nov. 29, 1968

[21] Appl. No.: 780,294

[52] U.S. Cl............260/570.9, 252/402, 260/45.9 R, 260/398.5, 260/455 A, 260/809
[51] Int. Cl................................................C07c 87/28
[58] Field of Search........................260/570.5, 570.9

[56] References Cited

UNITED STATES PATENTS

| | | |
|---|---|---|
| 3,491,102 | 1/1970 | O'Shea et al........260/570.9 X |
| 3,310,587 | 3/1967 | O'Shea................260/570.5 X |

*Primary Examiner*—Robert V. Hines
*Attorney*—Willard R. Sprowls

[57] ABSTRACT

This invention is concerned with a new series of compounds found to be useful as antioxidants, and their method of production. The compounds described as 3,5-dihydrocarbyl-4-hydroxyphenyl 3-hydrocarbyl-4-hydroxy-5-(dialkylamino methyl) benzyl sulfides are particularly effective for retarding oxidative deterioration in rubber, plastics, fats and petroleum products.

6 Claims, No Drawings

3,5-DIHYDROCARBYL-4-HYDROXYPHENYL 3-HYDROCARBYL-4-HYDROXY-5-(DIALKYLAMINO METHYL) BENZYL SULFIDE ANTIOXIDANTS

This invention is concerned with a new series of compounds which are useful as antioxidants for rubber, plastics, fats, petroleum products and other organic materials normally subject to oxidative deterioration. The compounds of this invention may be represented by the formula:

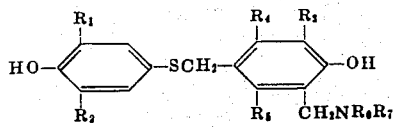

in which $R_1$, $R_2$ and $R_3$ may be alkyl groups of up to 12 carbon atoms each, cycloalkyl groups of six to eight carbon atoms each or aralkyl groups of seven to nine carbon atoms each, and $R_2$ may also be hydrogen, $R_4$ and $R_5$ may be hydrogen or methyl and $R_6$ and $R_7$ may be alkyl groups of up to five carbon atoms each.

This invention is also concerned with a novel method for preparing these compounds. This method involves the reaction of a 3-hydrocarbyl-4-hydroxy-5-(dimethylaminoethyl)benzyl N,N-dimethyldithiocarbamate with a 4-mercaptophenol under alkaline conditions according to the following equation:

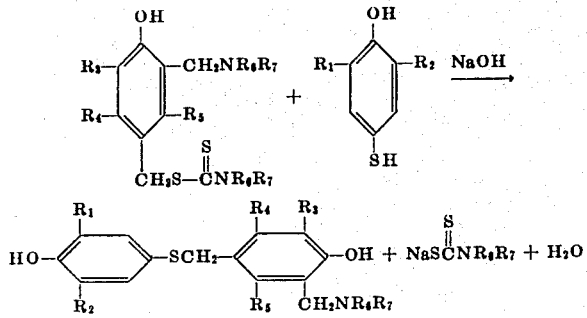

The compounds of this invention may be prepared by treating one molar equivalent of a compound of the general formula:

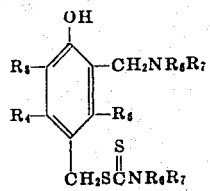

in which $R_3$ may be an alkyl group of up to 12 carbon atoms, a cycloalkyl group of six to eight carbon atoms or an aralkyl group of seven to nine carbon atoms, $R_4$ and $R_5$ may be hydrogen or methyl and $R_6$ and $R_7$ may be alkyl groups of up to five carbon atoms each with one molar equivalent of a mercaptophenol of the general formula:

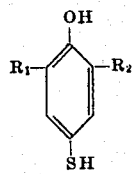

in which $R_1$ and $R_2$ may be alkyl groups of up to 12 carbon atoms each, cycloalkyl groups of six to eight carbon atoms or aralkyl groups of seven to nine carbon atoms and $R_2$ may also be hydrogen and one molar equivalent of an alkali metal hydroxide in a suitable water miscible solvent such as methanol, ethanol, isopropanol, dioxane, ethylene glycol dimethyl ether, etc., at a temperature from about room temperature to about 100°C.

Preferred solvents for the reaction are methanol, ethanol and isopropanol. The preferred temperature is in the range of 50°–100°C., the reaction ordinarily being carried out at or near the reflux temperature of the solution. The preferred time of the reaction is up to about 4 hours. Longer times may be used but are not necessary, the reaction generally being complete in 30 minutes or less.

The reaction may also be carried out in a two-phase system such as benzene-water, xylene-water, etc. using good agitation. Although longer reaction times are generally employed than in homogeneous solution, this heterogeneous system has the advantage of providing a simplified work-up procedure. In such a two-phase system, the product is soluble in the organic phase which can be readily separated from the aqueous phase containing the alkali metal dialkyldithiocarbamate. The product is then obtained by removing the solvent from the organic phase.

The intermediate hydroxybenzyl dithiocarbamates are prepared by reacting one molar equivalent of a phenolic compound of the general formula:

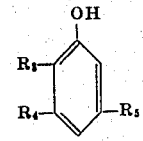

in which $R_3$, $R_4$ and $R_5$ are as previously described with at least two molar equivalents of formaldehyde, two molar equivalents of an amine of the formula:

$R_6R_7NH$ in which $R_6$ and $R_7$ are as previously described and one molar equivalent of carbon disulfide. This procedure is described in my U.S. Pat. No. 3,381,026 issued Apr. 30, 1968.

The hydrocarbon substituted phenols which may be used include o-cresol, o-ethylphenol, o-isopropylphenol, o-sec-butylphenol, o-t-butylphenol, o-t-amylphenol, o-(α-methylpentyl)phenol, o-(α-methylheptyl)-phenol, o-(α-methylnonyl)phenol, o-(α-methylundecyl)phenol, o-cyclohexylphenol, o-benzylphenol, o-cyclooctylphenol, o-(α-methylbenzyl)phenol, o-(α,α-dimethylbenzyl)phenol, 2,3-dimethylphenol, 2,5-dimethylphenol, 2,3,5-trimethylphenol, 6-isopropyl-m-cresol, 2-isopropyl-3,5-dimethylphenol, 6-t-butyl-m-cresol, 2-t-butyl-3,5-dimethylphenol, 6-sec-butyl-m-cresol, 2-sec-butyl-3,5-dimethylphenol, 6-(α-methylpentyl)-m-cresol, 2-(α-methylpentyl)-3,5-dimethylphenol, 6-t-amyl-m-cresol, 2-t-amyl-3,5-dimethylphenol, 6-(α-methylheptyl)-m-cresol, 2-(α-methylheptyl)-3,5-dimethylphenol, 6-(α-methylnonyl)-m-cresol, 2-(α-methylnonyl)-3,5-dimethylphenol, 6-(α-methylundecyl)-m-cresol, 2-(α-methylundecyl)-3,5-dimethylphenol, 6-t-octyl-m-cresol, 2-cyclohexyl-3,5-dimethylphenol, 6-cyclooctyl-m-cresol, 2-cyclooctyl-3,5-dimethylphenol, 6-benzyl-m-cresol, 2-benzyl-3,5-dimethylphenol, 6-(α-methylbenzyl)-m-cresol, 2-(α-methylbenzyl)-3,5-dimethylphenol, 6-(α,α-dimethylbenzyl)-m-cresol and 2-(α, α-dimethylbenzyl)-3,5-dimethylphenol.

The preferred phenols are o-alkylphenols in which the alkyl group contains from one to four carbon atoms such as o-cresol and o-t-butylphenol.

The secondary amines which may be used include dimethylamine, methylethylamine, diethylamine, dipropylamine, dibutylamine and diamylamine.

The preferred amine is dimethylamine.

The mercaptophenols which may be used include 2,6-dimethyl-4-mercaptophenol, 2,6-diisopropyl-4-mercaptophenol, 2-methyl-4-mercapto-6-t-butylphenol, 2,6-di-secbutyl-4-mercaptophenol, nd, 2,6-di-t-butyl-4-mercaptophenol, 2-methyl-4-mercapto-6-t-octylphenol, 2-methyl-4-mercapto-6-cyclohexylphenol, 2,6-dicyclooctyl-4-mercaptophenol, 2,6-di($\alpha$-methylundecyl)-4-mercaptophenol, 2-methyl-4-mercapto-6-($\alpha$-methylbenzyl)phenol, 2-methyl-4-mercapto-6-($\alpha,\alpha$-dimethylbenzyl)phenol, 2-methyl-4-mercaptophenol, 2-isopropyl-4-mercaptophenol, 2-t-butyl-4-mercaptophenol, 2-($\alpha$-methylundecyl)-4-mercaptophenol, 2-cyclooctyl-4-mercaptophenol and 2-($\alpha$-methylbenzyl)-4-mercaptophenol.

Any alkali metal hydroxide may be used with sodium hydroxide being preferred.

In U. S. Pat. No. 3,179,701 (Apr. 20, 1965), A. L. Rocklin described as new antioxidants compounds of the formula:

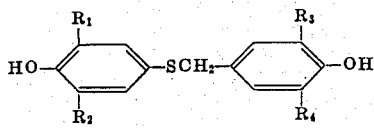

in which $R_1$, $R_2$, $R_3$ and $R_4$ are alkyl groups of up to eight carbon atoms each.

Our compounds differ from the compounds described by Rocklin in that one of the groups on the benzyl portion of the molecule is a dimethylaminomethyl group rather than an alkyl group. This structural difference provides an unexpected and important advantage over the prior art compounds. This advantage is one of superior non-discoloring properties while maintaining high activity.

Rocklin claims a particular advantage of the compounds he describes as being "the provision of bisphenols which do not undergo conversion to colored oxidation products". It will be evident from the working examples which follow that our compounds are superior to the compounds described by Rocklin in this regard.

To illustrate the novel bis-phenolic compounds and their methods of preparation, the following examples are given. In the examples, the proportions are expressed in parts by weight unless otherwise noted.

EXAMPLE 1

The preparation of 3-methyl-4-hydroxy-5-t-butylphenyl 3-cyclohexyl-4-hydroxy-5-(dimethylaminomethyl) benzyl sulfide.

To a solution of 9.8 g. (0.05 mole) of 2-methyl-4-mercapto-6-t-butylphenol and 4.2 g. (0.053 mole) of 50 percent aqueous sodium hydroxide in 50 ml. of ethanol was added 18.4 g. (0.05 mole) of 3-cyclohexyl-4-hydroxy-5-(dimethylaminomethyl)benzyl N,N-dimethyldithiocarbamate. The solution was heated near reflux for about 10 minutes. It was then cooled and diluted slowly in portions with 50 ml. of water. The crystalline precipitate was filtered off, washed with aqueous ethanol and dried to yield 19.5 g. (88 percent) of 3-methyl-4-hydroxy-5-t-butylphenyl 3-cyclohexyl-4-hydroxy-5-(dimethylaminomethyl)benzyl sulfide as a yellow solid, m.p. 141°–146°. The compound was purified by recrystallization from ethanol to give a white crystalline solid, m.p. 149°–151°.

Analysis: Calc'd. for $C_{27}H_{39}NO_2S$: % C, 73.5 % H, 8.84; % N, 3.18; % S, 7.25.

Found: % C, 73.33; % H, 8.98; % N, 3,47; % S, 7.05.

EXAMPLE 2

The preparation of 3-methyl-4-hydroxy-5-t-butylphenyl 3-t-butyl-4-hydroxy-5-(dimethylaminomethyl)benzyl sulfide.

To a solution of 9.8 g. (0.05 mole) of 2-methyl-4-mercapto-6-t-butylphenol and 4.8 g. (0.06 mole) of 50 percent aqueous sodium hydroxide in 50 ml. of ethanol was added 17 g. (0.05 mole) of 3-t-butyl-4-hydroxy-5-(dimethylaminomethyl)benzyl N,N-dimethyldithiocarbamate. The solution was heated near reflux for about 15 minutes. It was then poured into water and the product which separated was extracted with ether. The ether extract was dried with anhydrous sodium sulfate and evaporated to an oily residue which was crystallized from hexane to yield 12.5 g. (60 percent) of 3-methyl-4-hydroxy-5-t-butylphenyl 3-t-butyl-4-hydroxy-5-(dimethylaminomethyl)benzyl sulfide, m.p. 82°–84 °C. Recrystallization from hexane raised the melting point to 83°–85°C.

Analysis: Calc'd. for $C_{25}H_{37}NO_2S$: % C, 72.4; % H, 8.91; % N, 3.38; % S, 7.71.

Found: % C, 72.21; % H, 9.12; % N, 3.28; % S, 7.89.

EXAMPLE 3

The preparation of 3-methyl-4-hydroxy-5-t-butylphenyl 2,5-dimethyl-3-(dimethylaminomethyl)-4-hydroxy-benzyl sulfide. 2-Methyl-4-mercapto-6-t-butylphenol was reacted with 2,5-dimethyl-3-(dimethylaminomethyl)-4-hydroxybenzyl N,N-dimethyldithiocarbamate in the same manner as described in Example 1. The yield of 3-methyl-4-hydroxy-5-t-butylphenyl 2,5-dimethyl-3-(dimethylaminomethyl)-4-hydroxybenzyl sulfide was 72.5 percent, m.p. 127°–129°.

Analysis: Calc'd. for $C_{23}H_{33}NO_2S$: % C, 71.3; % H, 8.53; % N, 3.61; % S, 8.26.

Found: % C, 71.63; % H, 8.71; % N, 3.47; % S, 8.51.

EXAMPLE 4

The preparation of 3-methyl-4-hydroxy-5-t-butylphenyl 2-methyl-3-(dimethylaminomethyl)-4-hydroxy-5-t-butylbenzyl sulfide.

2-Methyl-4-mercapto-6-t-butylphenol was reacted with 2-methyl-3-(dimethylaminomethyl)-4-hydroxy-5-t-butylbenzyl N,N-dimethyldithiocarbamate in the same manner as described in Example 2 to yield 3-methyl-4-hydroxy-5-t-butylphenyl 2-methyl-3-(dimethylaminomethyl)-4-hydroxy-5-t-butylbenzyl sulfide as a viscous oil.

EXAMPLE 5

The preparation of 3-methyl-4-hydroxy-5-t-butylphenyl 3-benzyl-4-hydroxy-5-(dimethylaminomethyl)benzyl sulfide.

2-Methyl-4-mercapto-6-t-butylphenol was reacted with 3-benzyl-4-hydroxy-5-(dimethylaminomethyl)benzyl N,N-dimethyldithiocarbamate in the same manner as described in Example 2 to yield 3-methyl-4-hydroxy-5-t-butylphenyl 3-benzyl-4-hydroxy-5-(dimethylaminomethyl)benzyl benzyl sulfide as a viscous oil.

EXAMPLE 6

The preparation of 3,5-diisopropyl-4-hydroxyphenyl 3-methyl-4-hydroxy-5-(dimethylaminomethyl)benzyl sulfide.

2,6-Diisopropyl-4-mercaptophenol was reacted with 3-methyl-4-hydroxy-5-(dimethylaminomethyl)benzyl N,N-dimethyldithiocarbamate in the same manner as described in Example 2 to yield 3,5-diisopropyl-4-hydroxyphenyl 3-methyl-4-hydroxy-5-(dimethylaminomethyl)benzyl sulfide as an oil in 97 percent yield. The oil slowly crystallized to give the product as a solid, m.p. 112°–115° C. after recrystallization from hexane.

EXAMPLE 7

This example demonstrates the usefulness of the compounds of this invention as stabilizers for polyisoprene.

A commercial cis-polyisoprene synthetic rubber containing 2,6-di-t-butyl-p-cresol as a stabilizer was used as the base polymer. The polymer was dissolved in benzene so as to provide a 2 percent polymer solution. An aliquot portion of a benzene solution of the compound to be evaluated was added so as to provide 1 percent by weight of the additive based upon the weight of polymer in the solution. A thin film of rubber was then deposited on a sodium chloride disk by evaporating 10 drops of the solution on the one-inch diameter disk.

The disks were then placed in a 130°C. oven and removed after 30 minutes, 1 hour and every hour thereafter. At each interval, the infrared spectrum of the polymer film was obtained. Oxidation of the polymer film is evidenced by the appearance of a band at 5.85 $\mu$ in the spectrum caused by the development of carbonyl groups in the polymer. The time of aging required for the appearance of this band in the spectrum is taken as the break time. The effectiveness of compounds as stabilizers can be evaluated by the length of time they protect the rubber against oxidation as determined by this carbonyl development test.

The use of infrared spectrophotometry in following the oxidation of polymer films has been described by Bishop.

| Added Stabilizer | Hours to break |
|---|---|
| (1) None | ¼ |
| (2) 3-Methyl-4-hydroxy-5-t-butylbenzyl 3-methyl-4-hydroxy-5-t-butylphenyl sulfide | 4 |
| (3) 3,5-Di-t-butyl-4-hydroxybenzyl 3-methyl-4-hydroxy-5-t-butylphenyl sulfide | 4 |
| (4) 3-t-Butyl-4-hydroxy-5-(dimethylaminomethyl)-benzyl 3-methyl-4-hydroxy-5-t-butylphenyl sulfide | 9 |
| (5) 3-Cyclohexyl-4-hydroxy-5-(dimethylaminomethyl)-benzyl 3-methyl-4-hydroxy-5-t-butylphenyl sulfide | 10 |

These results demonstrate the effectiveness of compounds of this invention (4 and 5) as stabilizers and show their advantage over compounds of the prior art (2 and 3).

Non-discoloring characteristics were determined in this polymer by aging 1 gram of rubber obtained from the above described polymer solutions at 130°C. for 1 hour and observing for color formation.

| Added Stabilizer | Color |
|---|---|
| (1) 3-Methyl-4-hydroxy-5-t-butylbenzyl 3-methyl-4-hydroxy-5-t-butylphenyl sulfide | Yellow |
| (2) 3,5-Di-t-butyl-4-hydroxybenzyl 3-methyl 4-hydroxy-5-t-butylphenyl sulfide | Yellow |
| (3) 3-t-Butyl-4-hydroxy-5-(dimethylaminomethyl)benzyl 3-methyl-4-hydroxy-5-t-butylphenyl sulfide | Off-white |
| (4) 3-Cyclohexyl-4-hydroxy-5-(dimethylaminomethyl)benzyl 3-methyl-4-hydroxy-5-t-butylphenyl sulfide | Off-white |

These results show the significant advantage in non-discoloring properties of the compounds of this invention (3 and 4) over the prior art compounds (1 and 2).

Having thus described my invention, what I claim and desire to protect by Letters Patent is:

1. A chemical of the formula:

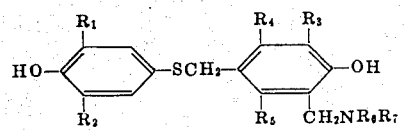

wherein $R_1$ and $R_3$ are selected from the group consisting of alkyl groups of up to 12 carbon atoms, cycloalkyl groups of from six to eight carbon atoms, or aralkyl groups of from seven to nine carbon atoms, where $R_2$ is selected from the group consisting of alkyl groups of up to 12 carbon atoms, cycloalkyl groups of from six to eight carbon atoms, phenylalkyl groups of from seven to nine carbon atoms or hydrogen, where $R_4$ and $R_5$ are selected from the group consisting of hydrogen and methyl, and $R_6$ and $R_7$ are selected from the group consisting of lower alkyl groups.

2. The compound of claim 1 wherein $R_1$ is methyl, $R_2$ is t-butyl, $R_3$ is methyl, $R_4$ and $R_5$ are hydrogen and $R_6$ and $R_7$ are methyl.

3. The compound of claim 1 wherein $R_1$ is methyl, $R_2$ is t-butyl, $R_3$ is t-butyl, $R_4$ and $R_5$ are hydrogen and $R_6$ and $R_7$ are methyl.

4. The compound of claim 1 wherein $R_1$ is methyl, $R_2$ is t-butyl, $R_3$ is methyl, $R_4$ is hydrogen and $R_5$, $R_6$ and $R_7$ are methyl.

5. The compound of claim 1 wherein $R_1$ is methyl, $R_2$ is hydrogen, $R_3$ is methyl, $R_4$ and $R_5$ are hydrogen and $R_6$ and $R_7$ are methyl.

6. The compound of claim 1 wherein $R_1$, $R_2$ and $R_3$ are methyl, $R_4$ and $R_5$ are hydrogen and $R_6$ and $R_7$ are methyl.

* * * * *